Figure 1:
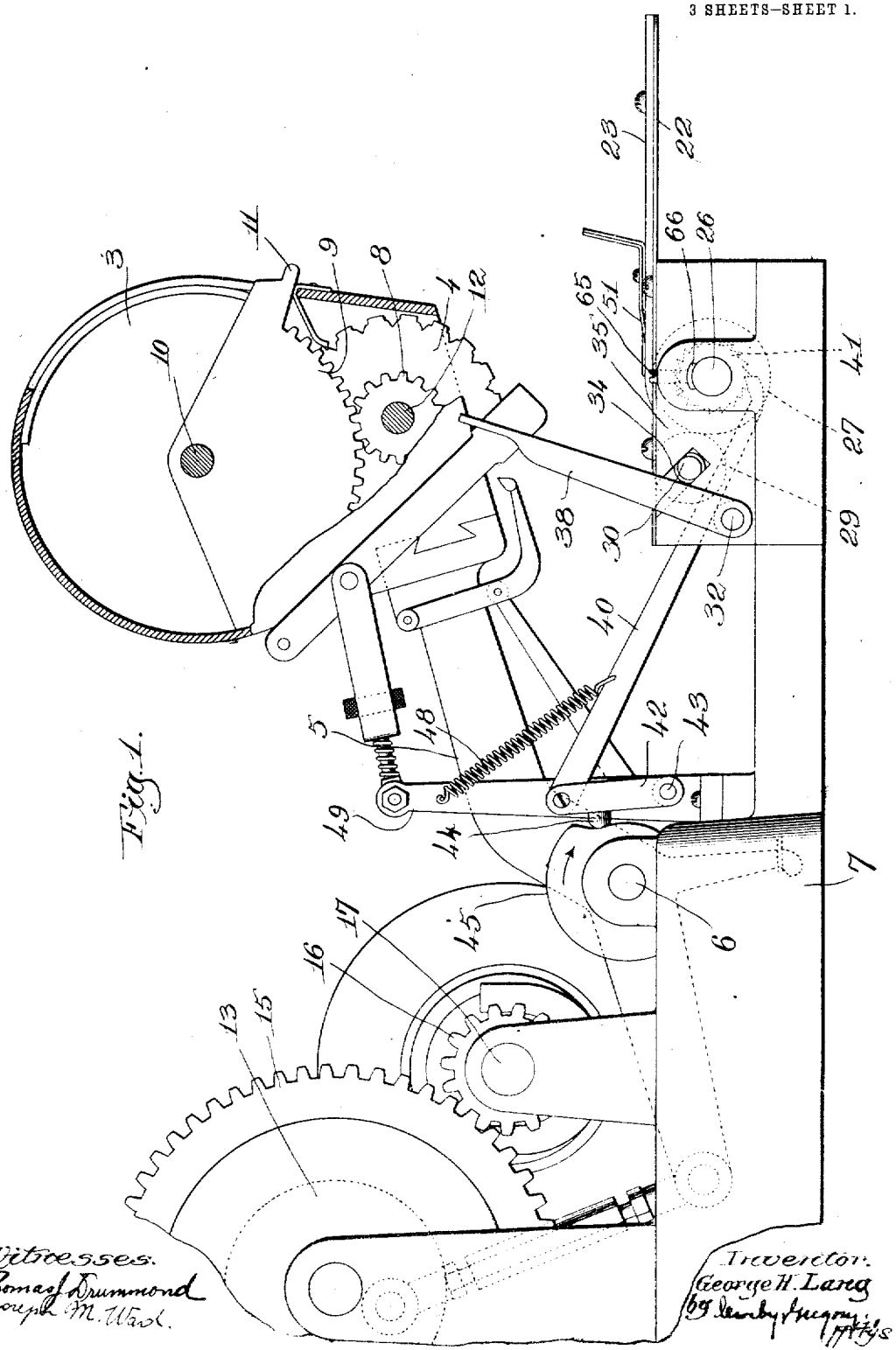

G. H. LANG.
TAG MARKING MACHINE.
APPLICATION FILED JULY 24, 1908.

1,023,570.

Patented Apr. 16, 1912.
3 SHEETS—SHEET 1.

Witnesses.
Thomas J. Drummond
Joseph M. West.

Inventor.
George H. Lang
by Newby Gregory
Attys

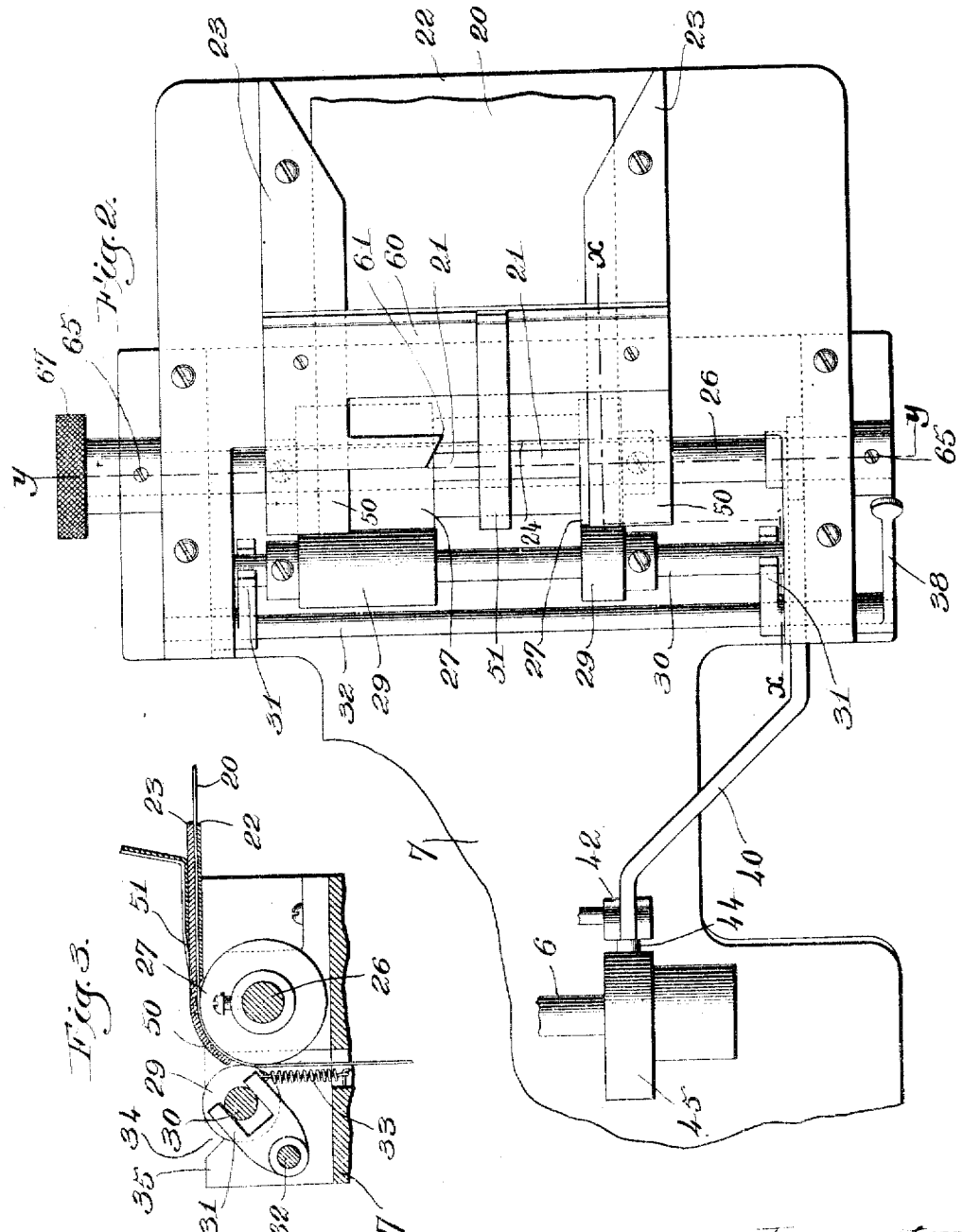

UNITED STATES PATENT OFFICE.

GEORGE H. LANG, OF BOSTON, MASSACHUSETTS.

TAG-MARKING MACHINE.

1,023,570.  Specification of Letters Patent.  Patented Apr. 16, 1912.

Application filed July 24, 1908. Serial No. 445,243.

*To all whom it may concern:*

Be it known that I, GEORGE H. LANG, a citizen of the United States, residing at Boston, county of Suffolk, and State of Massachusetts, have invented an Improvement in Tag-Marking Machines, of which the following description, in connection with the accompanying drawing, is a specification, like letters on the drawing representing like parts.

This invention relates to marking or printing machines of that character that are adapted to print the same mark or character a plurality of times on a tag or slip of paper.

The machine is especially designed for marking tags such as are used in connection with the manufacture of shoes, although it can be equally well used in marking tags that are used in connection with the manufacture of other articles.

It is now customary in shoe factories to make the shoes by cases, that is, the parts necessary to make all the shoes of a case of shoes are started through the factory together, passing from one operator to another, and each operator performs on the shoe his particular operation. A tag suitably printed to indicate the number of the particular case of shoes being operated on and the number of pairs of shoes in the case, and also any other data desired is sent through the factory with each case of shoes; and each tag is usually sub-divided into sections, each section being marked to indicate the number of the case, number of pairs of shoes in the case, and any other required data. As each operator performs his work on the shoes of any case of shoes, he severs from the tag one of the marked sub-divisions thereof to indicate that he has performed his particular operation on the shoes of the particular case indicated on the tag. A tag such as above described has to have imprinted thereon the required data as many times as there are different operations to be performed on the shoe.

It is the object of my present invention to provide a novel marking machine which is adapted to print the same numbers or characters rapidly and any number of given times on a tag.

The features wherein my invention resides will be more fully hereinafter described and then pointed out in the appended claims.

Figure 4:
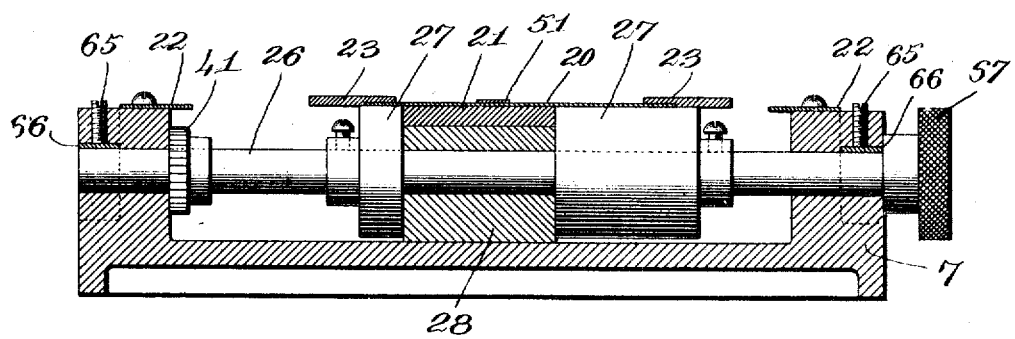
Figure 5:
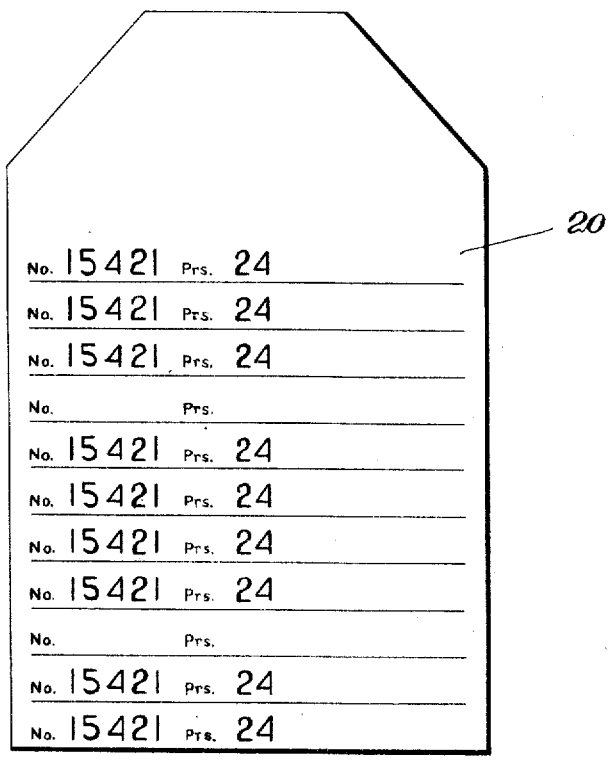

In the drawings wherein I have shown the preferred embodiment of my invention, Figure 1 is a side view of a marking device embodying the invention; Fig. 2 is a top plan view of the platen and feed mechanism for the tag; Fig. 3 is a section on the line $x$—$x$, Fig. 2; Fig. 4 is a section on the line $y$—$y$, Fig. 2; Fig. 5 shows a tag which has been printed on by my machine.

In the machine herein shown the characters are printed on the tag by means of a printing head 3 which carries a plurality of independently-adjustable type disks 4 and which is mounted on a vibrating arm 5 which is carried by a rock-shaft 6 that is journaled to the frame 7 of the machine. The type disks are rotatably mounted on a shaft 12 and each type-disk 4 has thereon type or characters such as it is desired to print on the tag, the characters which are most commonly printed on the tag being numbers. Where this is the case each type disk may have thereon the digits from 0 to 9. Any desired number of type disks may be employed and the type-disks are independently adjustable so that any desired combination of figures can be printed. While the adjustment of the type disks may be secured in any suitable way, I have shown each type disk as having rigid therewith a pinion 8 which meshes with a segmental gear 9 suitably pivoted on a shaft 10 and having a thumb-piece 11 projecting through the casing of the head by which it may be turned. The arm 5 may be vibrated by any appropriate mechanism, that herein shown comprising a crank disk 13 connected to the end of the lever 5 by means of a link 14, said crank disk having rigid therewith a gear wheel 15 that meshes with and is driven by a pinion 16 carried on the driving shaft 17. Any other way of vibrating the printing head than that herein shown, however, may be employed without departing from the invention. This type of printing head and the means for vibrating it are or may be all as shown in my Patents Number 864,790 and Number 877,653, and form no part of my present invention.

The tag 20 to be printed is supported on a platen 21 during the printing operation, this platen being situated directly beneath the printing head, and in such a position that it receives the imprint of the type as the printing head descends. The printing of the tag is accomplished by causing the tag to be fed across the platen with a stepby-step movement as the printing head rises and descends whereby the same numbers or characters are printed a plurality of times on the tag.

The tag 20 is supported on a table 22 during the feeding operation, said table being substantially on the level of the top of the platen, and said tag is guided as it is fed over the table by suitable guides 23 which engage the side thereof. The edge 24 of the table is situated closely adjacent the platen, as best seen in Fig. 2, so that the tag can readily pass from the table over the platen. For feeding the tag forward with the step-by-step movement I have shown feed rolls which are situated to engage the tag at that portion thereof on which the printing does not appear. In the present embodiment the feed rolls are separate from the platen and are arranged to engage the tag at a point in advance of the place where the printing is done although this is not essential to the invention.

Situated directly beneath the platen is a shaft 26 which is adapted to be positively driven and which has thereon one or more feed rolls 27, two such feed rolls being herein shown. The shaft may conveniently extend through and be journaled in the base 28 on which the platen is supported. Co-operating with the feed rolls 27 are other rolls 29 which are in the nature of presser rolls. These rolls 29 are mounted on a shaft 30 which is journaled in inclined slots 34 formed in the side or cheek pieces 35 of the frame. Said shaft is embraced by slotted arms 31 extending from a rock-shaft 32 that is mounted in suitable bearings in the frame. A suitable spring 33, see Fig. 3, secured to one of the arms 31 tends to pull the arms downwardly, thus yieldingly holding the presser roll 29 against the feed roll 27. The slots 34 incline upwardly away from the feed roll and the slotted arms 31 incline in the opposite direction as seen in Figs. 1 and 3. The shaft 32 has fast thereto an arm 38 by means of which the rock-shaft 32 may be turned to carry the slotted arms 31 away from the feed rolls 27 thereby causing the shaft 30 to be moved upwardly in the slot 34 and separating the rolls 29 from the feed rolls 27. This is done whenever it is desired to place a new tag into the machine in position to be engaged by the feed rolls. When the lever 38 is released, the spring or springs 33 hold the presser rolls 29 in engagement with the feed rolls 27.

The shaft 26 carrying the feed rolls 27 is turned forward positively with a step-by-step motion by means of a pawl 40 which is adapted to engage the teeth of a ratchet-wheel 41 fast on the shaft 26. This pawl is operated by a member rigid with the arm and turning about the axis thereof. In the present embodiment of the invention, said pawl 40 is shown as pivoted at one end to an arm 42 which in turn is pivotally mounted on the frame, as at 43. The arm 42 has extending therefrom a projection or lug 44 which is adapted to be engaged by a cam 45 fast on the rock-shaft 6 that pivotally supports the vibrating arm 5. A spring 48 which is connected at one end to the pawl 40 and at the other end to a fixed stand 49 serves both to keep the pawl against the ratchet wheel and to keep the projection 44 against the cam 45. As the arm 5 vibrates to give the printing head its downward movement, the shaft 6 is rocked in the direction of the arrow Fig. 1 and the cam 45 operates against the projection 44 thereby to advance the pawl 40 and turn the feed wheel 27 one step forward, thus feeding the tag that much. The cam 45 is so arranged that the complete feeding movement will be given before the type are brought into contact with the tag. As the arm 5 and printing head are elevated, the spring 48 causes the pawl 40 to be retracted as the high portion of the cam 45 passes out from under the projection 44. The tag is thus fed forward one step each time that an impression is made.

It will be noted that the feed rolls grip the tag at a point somewhat in advance of that on which the impression is made and that the presser roll engages the tag on the side of the feed roll and below the plane of the table 22. In order to guide the front end of the tag into the space between the rolls when the tag is inserted in the machine, I have made the guide 23 which overlies the edges of the tag with the downwardly-curved ends 50, said ends having a curvature concentric with that of the feed rolls 27 and being situated directly over said feed rolls, as plainly seen in Fig. 3. When the tag is to be inserted, it is pushed over the table 22 underneath the guides 23 and the forward ends 50 of said guides direct the tag between the rolls 27, 29.

Sometimes the tag to be printed is cut at the corners, as shown in Fig. 5, and in order to properly guide a tag of this nature into the space between the feed rolls, I have provided an additional guide finger 51 which is secured to a bridge piece 60 that connects the two guides 23. This guide finger 51 extends forwardly and is curved downwardly at its end in the same manner that the ends 50 of the guides 23 are. When the tag such as shown in Fig. 5 is inserted beneath the guides the central portion of the end of the tag is directed downwardly so that the tag will properly enter the space between the feed rolls.

In order to enable the operator to properly position the tag for making the first impression thereon, I have provided an index finger 61 which is rigid with the bridge 60 and the end of which is situated adjacent the platen 21. The operator inserts the tag beneath the guides 23 and pushes it forward until the line where the first impression is to be made is opposite the index finger 61. It should be remarked that when the machine is stopped, the head is in the elevated position as shown in Fig. 1, and it will be remembered that the feeding movement of the tag takes place while the head is descending. After the tag has been thus inserted to bring the line where the first impression is to be made opposite the index finger the machine is ready to be started, and as the printing head descends the tag is fed forward to bring the first space thereon over the platen and in position to receive the impression.

In order to prevent the feed roll from overrunning when the machine is operated rapidly I have provided a friction device which coöperates with the shaft 26 to hold the latter at rest except when it is being fed forward by the pawl and ratchet. This friction device may conveniently be in the form of a clamping screw 65 which bears against a pad or brake 66 that rests on and engages the shaft 26.

The end of the shaft 26 is provided with a hand wheel 67 by which said shaft and the feed rolls 27 may be turned by hand. In printing some tags it is desirable to skip certain sections, as shown in Fig. 5, so that the printing will appear on part only of the sections. Whenever it is desired to skip any section the tag may be turned forward by hand by means of the hand wheel 67.

Some users of tags prefer to have them printed on one edge, others prefer to have them printed on the other edge, and other users prefer to have them printed in the middle with both edges left free. My machine is adapted to print tags in any one of these various ways and to accomplish this I make the feed rolls 27 and presser rolls 29 capable of adjustment longitudinally of their respective shafts and provide for shifting the platen 21 longitudinally. As shown in the drawings the platen is situated between the two rolls 27. If the printing is to be placed on the tag near the opposite edge from that shown in Fig. 5 the operator will exchange the places of the feed rolls 27 so that the wider feed roll will be situated where the narrow one is in Fig. 2. If the printing is to be placed at both edges of the tag with the center of the tag left clear, then the feed rolls will be placed centrally of the shaft and two platens will be employed either side of the feed rolls. The platen or platens are held in place by the shaft 26 extending therethrough and can readily be adjusted longitudinally of the shaft into any desired position according to the position of the feed rolls.

While I have illustrated herein one embodiment of my invention, I do not wish to be limited to the constructional features shown.

Having fully described my invention, what I claim as new and desire to secure by Letters is:—

1. In a tag-printing machine, the combination with a pivotally mounted arm and and a printing head connected thereto, of a fixed platen to support the tag while being printed, a feed roll situated to engage the tag, yielding means to hold the tag against the feed roll, a ratchet rigid with the feed roll, a pawl therefor, a member rigid with and turning about the same axis as the arm for operating the pawl, and edge guides extending from the feed roll some distance in the direction from which the work is being fed.

2. In a tag-printing machine, the combination with a pivotally-mounted arm and a printing head connected thereto, of a fixed platen to support the tag while being printed, a feed roll situated to engage the tag at a point substantially in line with the line on which the impression is made, yielding means to hold the tag against the feed roll, a ratchet rigid with the feed roll, a pawl therefor, a member rigid with and turning about the same axis as the arm for operating the pawl, and edge guides extending from the feed rolls some distance therefrom in the direction from which the work is fed.

3. In a tag-printing machine, the combination with a reciprocating printing head carrying adjustable type, of a fixed platen to support the tag while being printed, a positively-driven feed roll, a presser roll coöperating with the feed roll to feed the tag, a rock-shaft having slotted arms in which the presser roll is mounted and means to determine the position of the presser roll in the slots of said arms as the rock shaft is turned about its axis.

4. In a tag-printing machine, the combination with a reciprocating printing head carrying adjustable type, of a fixed platen to support the tag while being printed, a positively-driven feed roll, a presser roll coöperating with the feed roll to feed the tag, a rock-shaft having slotted arms in which the presser roll is mounted, a spring acting on said arms to maintain the presser roll in yielding engagement with the feed roll and a frame having slots that incline in a direction opposite to those of the arms and in which the shaft of the presser roll is mounted.

5. In a tag-printing machine, the combination with a reciprocating printing head carrying adjustable type and a rock-shaft on which said head is mounted, of a platen to support the tag while being printed, a feed roll for feeding the tag forward, a ratchet wheel rigid with the feed roll, a cam on the rock-shaft, and a pawl actuated by the cam and engaging the ratchet.

6. In a tag-printing machine, the combination with a frame, of a vertically-movable printing head carried thereby, a shaft journaled in the frame, a feed roll thereon and adjustable longitudinally thereof, a platen adjustable transversely of the direction of feed and longitudinally of the feed roll and having its impression-receiving surface situated in line with the feed roll in the direction of its length.

7. In a tag-printing machine, the combination with a reciprocating printing head carrying adjustable type, of a shaft, a feed roll adjustably mounted thereon, and a platen having a bore through which the shaft extends said platen being held in position by said shaft.

8. In a tag-marking machine, the combination with a frame, of a vertically-movable printing head operated thereby, a feed roll adapted to engage the tag and adjustable transversely of the direction of feed, means to operate the feed roll, and a platen situated in line with the feed roll in the direction of its length and also adjustable transversely of the direction of feed whereby the feed roll may be made to engage the tag at different places transversely thereof and the impression may be made thereon at different places transversely thereof.

9. In a printing machine, the combination with a platen, of a printing head carrying adjustable type and movable toward and from the platen, means to feed the tag to be printed over the platen with an intermittent motion and to give the tag its feeding movement as the printing head is approaching the platen, and an index member situated to indicate the line on which the impression will be made after the tag has been given its feeding movement.

In testimony whereof, I have signed my name to this specification, in the presence of two subscribing witnesses.

GEORGE H. LANG.

Witnesses:
LOUIS C. SMITH,
THOMAS J. DRUMMOND.